(12) United States Patent
DeHaan

(10) Patent No.: US 8,914,787 B2
(45) Date of Patent: Dec. 16, 2014

(54) REGISTERING SOFTWARE MANAGEMENT COMPONENT TYPES IN A MANAGED NETWORK

(75) Inventor: Michael Paul DeHaan, Morrisville, NC (US)

(73) Assignee: Red Hat, Inc., Raleigh, NC (US)

(*) Notice: Subject to any disclaimer, the term of this patent is extended or adjusted under 35 U.S.C. 154(b) by 1206 days.

(21) Appl. No.: 12/551,494

(22) Filed: Aug. 31, 2009

(65) Prior Publication Data

US 2011/0055810 A1 Mar. 3, 2011

(51) Int. Cl.
*G06F 9/45* (2006.01)
*G06F 9/44* (2006.01)
*G06F 21/62* (2013.01)
*H04L 12/24* (2006.01)

(52) U.S. Cl.
CPC ............ *H04L 12/24* (2013.01); *G06F 21/6272* (2013.01); *G06F 2221/2115* (2013.01); *H04L 41/00* (2013.01); *G06F 2221/2129* (2013.01)
USPC .......................................... 717/171; 717/121

(58) Field of Classification Search
USPC .................................................. 717/121, 171
See application file for complete search history.

(56) References Cited

U.S. PATENT DOCUMENTS

| | | | |
|---|---|---|---|
| 6,154,128 A | 11/2000 | Wookey et al. | |
| 6,185,689 B1 * | 2/2001 | Todd et al. | 726/25 |
| 6,263,455 B1 | 7/2001 | Bannister | |
| 6,327,677 B1 | 12/2001 | Garg et al. | |
| 6,529,784 B1 | 3/2003 | Cantos et al. | |
| 6,575,729 B2 * | 6/2003 | Godwin et al. | 425/549 |
| 6,611,869 B1 | 8/2003 | Eschelbeck et al. | |
| 6,636,521 B1 | 10/2003 | Giulianelli | |
| 6,721,880 B1 | 4/2004 | Pike | |
| 6,778,647 B1 * | 8/2004 | Dumas | 379/93.12 |
| 6,915,457 B1 | 7/2005 | Miller | |
| 7,039,724 B1 * | 5/2006 | Lavian et al. | 709/250 |
| RE39,717 E | 7/2007 | Yates et al. | |
| 7,359,962 B2 * | 4/2008 | Willebeek-LeMair et al. | 709/223 |
| 7,373,553 B2 | 5/2008 | Tripp et al. | |
| 7,441,021 B1 | 10/2008 | Perry | |
| 7,590,653 B2 * | 9/2009 | Sparks | 709/221 |
| 7,590,669 B2 * | 9/2009 | Yip et al. | 709/222 |
| 7,660,824 B2 | 2/2010 | Halpern et al. | |

(Continued)

OTHER PUBLICATIONS

Bellavista et al., "How to Monitor and Control Resource Usage in Mobile Agent Systems," IEEE, 2001, 11pg.*

(Continued)

*Primary Examiner* — Ryan Coyer
(74) *Attorney, Agent, or Firm* — Lowenstein Sandler LLP

(57) ABSTRACT

Embodiments relate to systems and methods for registering management software component types in a managed network. In embodiments, a central registration server can scan a managed network to identify different types and configurations of target machines. The registration server can, for instance, perform an authorization process on some or all targets in a network, and determine a management software component type required by or compatible with each target. The Different target machines may have requirements for different management software component types depending, for instance, on the operating system or other resources installed on each target. Once a management software component type has been identified, the registration server can take an inventory of further resources hosted on the target, as well as identify types of management agents that can be distributed to the target to registration to remote management services, such as configuration management or performance monitoring services.

20 Claims, 4 Drawing Sheets

(56) References Cited

U.S. PATENT DOCUMENTS

| | | |
|---|---|---|
| 7,693,966 B2 | 4/2010 | Schmid |
| 7,769,990 B1 | 8/2010 | Okcu et al. |
| 7,856,496 B2 | 12/2010 | Kline |
| 7,865,578 B1 | 1/2011 | Gerraty |
| 7,987,228 B2 * | 7/2011 | McKeown et al. ............ 709/202 |
| 2002/0184349 A1 | 12/2002 | Manukyan |
| 2003/0055931 A1 | 3/2003 | Cravo De Almeida et al. |
| 2003/0061323 A1 | 3/2003 | East et al. |
| 2003/0120754 A1 | 6/2003 | Muto et al. |
| 2003/0177412 A1 | 9/2003 | Todd |
| 2003/0192039 A1 * | 10/2003 | McConnell ................... 717/171 |
| 2003/0208589 A1 | 11/2003 | Yamamoto |
| 2004/0006546 A1 | 1/2004 | Wedlake et al. |
| 2004/0032625 A1 | 2/2004 | Yamano |
| 2004/0034577 A1 | 2/2004 | Van Hoose et al. |
| 2004/0198319 A1 | 10/2004 | Whelan et al. |
| 2004/0230828 A1 | 11/2004 | DeFuria et al. |
| 2005/0005169 A1 * | 1/2005 | Kelekar ........................ 713/201 |
| 2005/0066218 A1 | 3/2005 | Stachura et al. |
| 2005/0198196 A1 | 9/2005 | Bohn et al. |
| 2006/0004806 A1 | 1/2006 | Kraft |
| 2006/0031188 A1 | 2/2006 | Lara et al. |
| 2006/0050862 A1 | 3/2006 | Shen et al. |
| 2006/0075294 A1 | 4/2006 | Ma et al. |
| 2006/0101517 A1 * | 5/2006 | Banzhof et al. ................ 726/25 |
| 2006/0161444 A1 | 7/2006 | Lubrecht et al. |
| 2007/0005661 A1 | 1/2007 | Yang |
| 2007/0027936 A1 | 2/2007 | Stakutis et al. |
| 2007/0038679 A1 | 2/2007 | Ramkumar et al. |
| 2007/0067846 A1 * | 3/2007 | McFarlane et al. ............. 726/25 |
| 2007/0074077 A1 | 3/2007 | Markow et al. |
| 2007/0121527 A1 | 5/2007 | Zhou et al. |
| 2007/0266124 A1 | 11/2007 | Kinyon et al. |
| 2007/0288530 A1 | 12/2007 | Romem et al. |
| 2008/0016186 A1 | 1/2008 | Ball |
| 2008/0091466 A1 | 4/2008 | Butler et al. |
| 2008/0196107 A1 * | 8/2008 | Yip et al. ........................ 726/27 |
| 2008/0209033 A1 | 8/2008 | Ginter et al. |
| 2008/0219563 A1 | 9/2008 | Moroney |
| 2008/0244047 A1 | 10/2008 | Yeung et al. |
| 2009/0007269 A1 * | 1/2009 | Bianco ........................... 726/25 |
| 2009/0070442 A1 | 3/2009 | Kacin et al. |
| 2009/0132698 A1 * | 5/2009 | Barnhill, Jr. .................. 709/224 |
| 2009/0193413 A1 | 7/2009 | Lee |
| 2009/0276620 A1 | 11/2009 | McCarron et al. |
| 2009/0276772 A1 | 11/2009 | Garrett et al. |
| 2009/0300180 A1 | 12/2009 | DeHaan et al. |
| 2010/0077076 A1 | 3/2010 | Wada |
| 2010/0088197 A1 | 4/2010 | DeHaan |
| 2010/0131625 A1 * | 5/2010 | Dehaan et al. ................ 709/221 |
| 2010/0185590 A1 | 7/2010 | D'Angelo et al. |
| 2010/0198964 A1 | 8/2010 | Tanaka |
| 2010/0218014 A1 | 8/2010 | Bozek et al. |
| 2010/0218179 A1 * | 8/2010 | Balascio et al. .............. 717/171 |
| 2010/0223274 A1 | 9/2010 | DeHaan |
| 2010/0223375 A1 | 9/2010 | DeHaan |
| 2010/0275064 A1 | 10/2010 | DeCusatis et al. |
| 2010/0306334 A1 | 12/2010 | DeHaan |
| 2010/0306347 A1 | 12/2010 | DeHaan |
| 2010/0306359 A1 | 12/2010 | DeHaan |
| 2011/0047414 A1 | 2/2011 | Kudo et al. |
| 2011/0055361 A1 | 3/2011 | DeHaan |
| 2011/0055636 A1 | 3/2011 | DeHaan |
| 2011/0055669 A1 | 3/2011 | DeHaan |
| 2011/0078301 A1 | 3/2011 | DeHaan |
| 2011/0107299 A1 | 5/2011 | Dehaan |

OTHER PUBLICATIONS

Sammons, Nathaniel, "Multi-platform Interrogation and Reporting with Rscan," USENIX, 1995, 15pg.*

* cited by examiner

REGISTERING SOFTWARE MANAGEMENT COMPONENT TYPES IN A MANAGED NETWORK

FIELD

The present teachings relate to systems and methods for registering software management component types in a managed network, and more particularly to platforms and techniques for initiating an automatic scan of target machines in a network and identifying required or compatible types of software management components for those targets, such as configuration management or performance monitoring agents, and storing the identified types to a database.

BACKGROUND OF RELATED ART

In large, heterogeneous networks, a variety of different types of clients, hosts, and/or other nodes may be present. In terms of performing network management tasks on those diverse machines, each target in a managed network can have a different set of installed resources, including operating systems, and therefore require different types of management agents and installation procedures in order to link to desired network services. Those network services can include, for example, configuration management services, performance monitoring services, security services and others, all of which can typically be hosted and supported in remote management servers.

In conventional networks, an administrator may need to manually inspect or register target machines to assign the machines an appropriate or compatible management software component type, indicating what kind of local management agents are required to connect and register with remove management servers. While it may be possible and relatively convenient to identify the necessary management software component type at the time a target machine receives its original installation, in part because constituent operating system, application, and other details are know, it is difficult at downstream times to configure targets for proper management software component types, since their operating system type or version, as well as other configuration details, may change. It may be desirable to provide methods and systems for registering software management component types in a managed network, in which the types and/or classes of management software components required by or compatible with diverse machines can be automatically scanned, identified and stored to a database.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for registering software management component types in a managed network. More particularly, embodiments related to platforms and techniques for the automatic scanning of target machines and/or other nodes in a managed network, to identify a management software component type to be associated with a given target. For instance, target machines running the Linux™ operating system can require or be compatible with a certain set of management agents to connect to remote management servers and their associated services. For instance, target machines and/or other nodes may desire to register or connect to configuration management services, performance monitoring services, security services, authentication services, and/or other remotely hosted network management services or resources, and each type of service may require a different or distinct type of local management agent or daemon to be installed on the target machine to install or run those desired services. In embodiments in certain regards, a central registration server according to the present teachings can invoke or access a registration tool and/or other logic to probe the manage network to discover the identity of the constituent target machines and/or other nodes, and determine the necessary management software component type required or compatible with each detected machine. The registration tool can also interrogate individual target machines to develop an inventory of resources hosted or present on that machine, such as hardware, software, communications, and/or other resources. The result profile including target identifier, management software component type, inventory of resources, and other data can be stored to a registration store. In embodiments, the registration tool and/or other logic can generate a link, association, channel, or other connection to a stored set of the corresponding management agents, for instance to permit target machines to automatically download those agents, independently of any package management platforms associated with the target, its operating system, and/or other configuration details. Once one or more management agents are installed in a given target, that target can invoke remote management services over the network, and perform updates related to those services as desired.

Reference will now be made in detail to exemplary embodiments of the present teachings, which are illustrated in the accompanying drawings. Where possible the same reference numbers will be used throughout the drawings to refer to the same or like parts.

Figure 1:
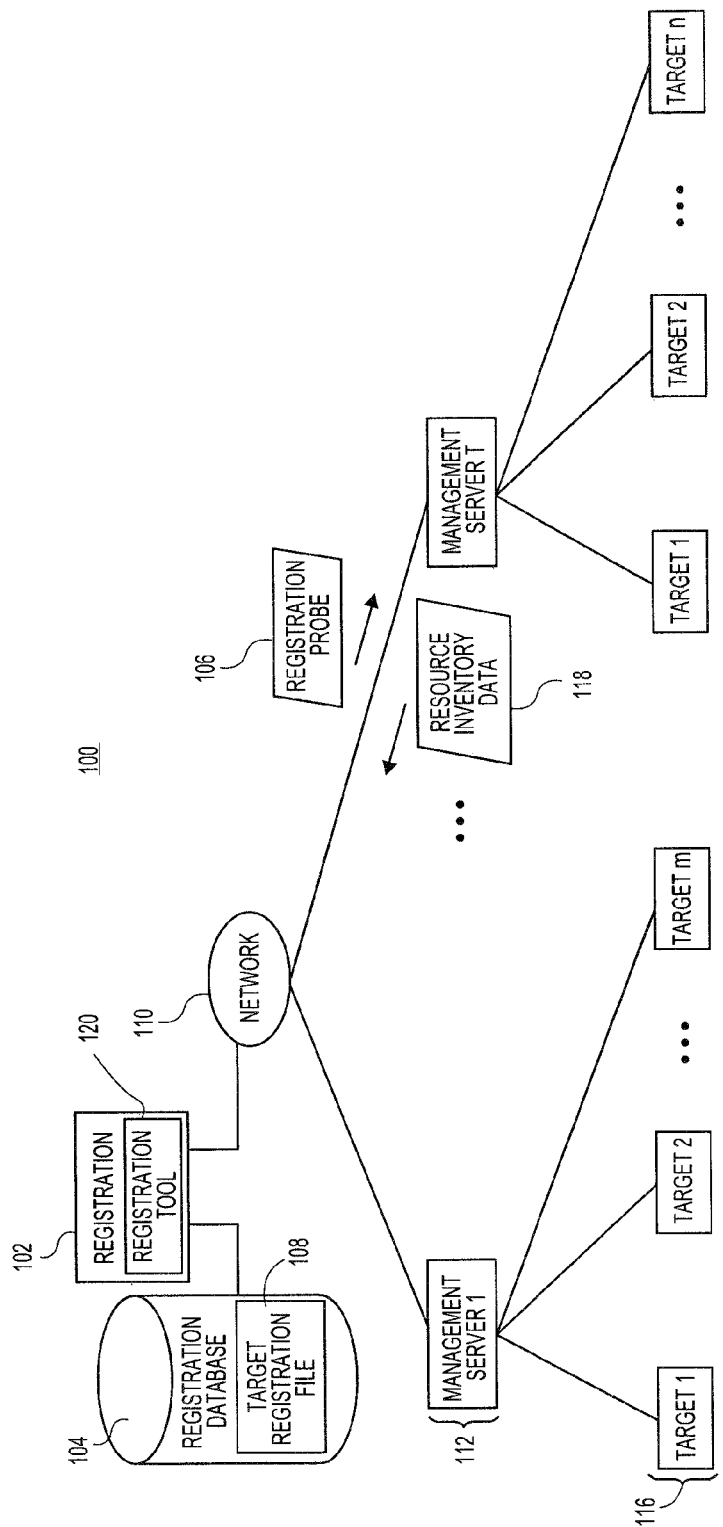
FIG. 1 illustrates an overall network in which systems and methods for registering software management component types in a managed network can be implemented, according to various embodiments.

FIG. 1 illustrates an overall network 100 in which systems and methods for registering software management component types in a managed network can be implemented, according to various embodiments of the present teachings. In embodiments as shown, a registration server 102 can communicate with a managed network 110 to carry out various installation, provisioning, network management, deployment, or other services. In embodiments, registration server 102 can communicate with managed network 110 via secure or non-secure channels or connections, including, for instance, the Internet or other public or private networks. In embodiments, registration server 102 can host, maintain, or communicate with a set of associated resources including a registration database 104, which can be or include a local or remote database or data store hosting information related to a set of target machines 112 hosted in managed network 110. In embodiments, registration server 102 can comprise, host, or access a registration tool 120 containing applications, logic, and/or other resources to generate, filter, store, route, and manage the deployment of management agents and related network management services executed over or in managed network 110.

Managed network 110 can include or host a set of resources including a set of targets 112, and/or other nodes, machines, or resources. In embodiments, set of targets 112, and/or other nodes or resources of managed network 110 can be or include virtual machines, as well as hardware-based or hardware-implemented machines. In embodiments, set of targets 112 and/or other resources of managed network 110 can be or include resources instantiated from or based on cloud-based networks. Set of targets 112 can be or include, for example, server machines, client machines, portable computing devices, wireless communication devices, and/or other clients, machines, or devices.

More particularly, and as shown in FIG. 1, registration tool 120 hosted in registration server 102 can generate a registration probe 106 to transmit to one, some, or all of the target machines in set of target machines 112 in managed network 110. In aspects, registration probe 106 and/or the targets to which registration probe 106 is transmitted can be automatically generated by registration tool 120, for instance using network pings or "nmap port" scans or commands, as understood by persons skilled in the art. In embodiments, targets or networks can be entered manually by a user of registration tool 120. In aspects, registration probe 106 can initially attempt to identify targets and/or other nodes in managed network 110, for instance to generate a list or map of machines and/or nodes present in managed network 110. In embodiments, the initial detection or scan of targets can determine a management software component type required by or compatible with each target, for instance, based on the operating system installed on each target, if detected.

In aspects, after identification of each target or at other times, registration tool 120 can transmit or update the same or an additional registration probe 106 to gain entry into each target system being registered to registration database 104. In aspects, registration probe 106 can attempt to present security credentials or use security mechanisms to log into or otherwise gain access to one or more targets in set of target machines 112, such as presenting common passwords/credentials for each system, invoking kerberized secure shell (SSH) service, SSH authorized keys, invoking Windows™ trusted domains, or presenting known username/passwords, depending on the type of target or platform.

Figure 2:
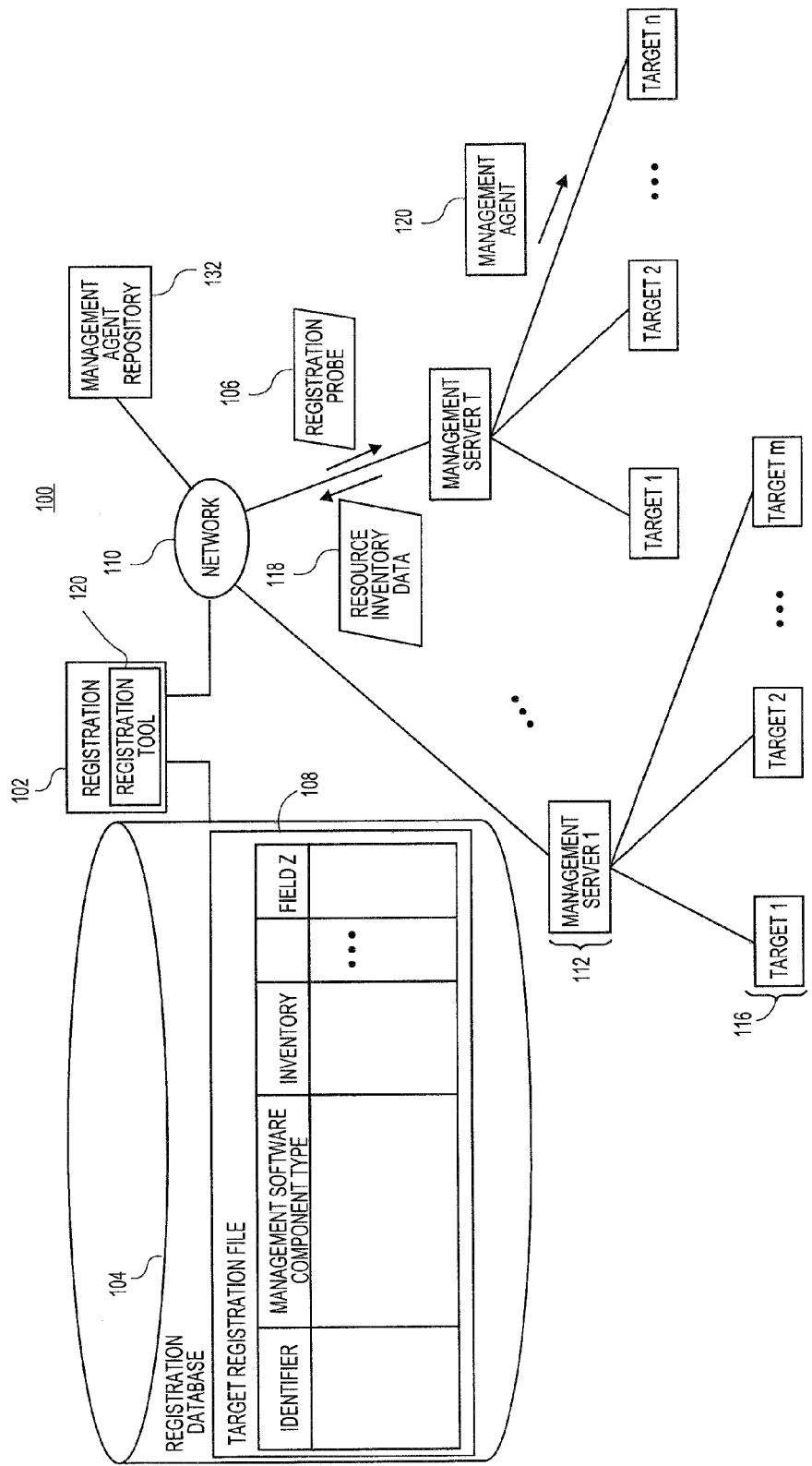
FIG. 2 illustrates an overall network in which systems and methods for registering software management component types in a managed network can implemented, according to various embodiments in further regards.

As shown for instance in FIG. 2, once access is established, registration tool 120 can collect information regarding the inventory of resources installed or present in each subject target in set of target machines 112. In embodiments, registration probe 106 or further or updated interrogation exchanges between a given target in set of targets 112 and registration tool can provide an identification of hardware, software, communications, and/or other resources present in the target. In embodiments, for example, systems such as "/proc" or "HAL" under the Linux™ operating system, or systems or commands such as those used with a "WMI" interface under the Windows™ family of operating systems, can be used to interrogate the subject target or targets regarding installed resources. In embodiments as shown, resource inventory data 118 can be returned to registration server 102 indicating the resources hosted or installed on a subject target. In embodiments as likewise shown, registration tool 120 can receive that information and associate a target identifier, management software component type, resource inventory data 118, and/or other data for storage and registration in a target registration file 108 hosted in registration database. In aspects, the entry for a given target can include an identifier such as an internet Protocol (IP) address, one or more management software component type, an inventory including installed applications, hardware, communications resources such as ports and service levels, and/or other resources. In embodiments, target registration file 108 can include links, addresses, or other mappings or identifiers to one or more management agent repository 132 that can contain one or more management agent 120 corresponding to one or more management software component type.

In aspects, registration tool 120 and/or other logic can initiate the transmission and/or installation of one or more management agent 120 to a given target in set of target machines 112, based on the requirements of management software component type, any installed applications, and/or other resources. In embodiments, one or more management agent 120 can be pushed to a target at time of registration or at other times, using transmission techniques compatible with the types of agents involved. For instance, for transmission to a Linux™ target, an "scp" command to perform or invoke a Red Hat Package Manager (RPM) or "deb" process can be used, or a tarball can be unzipped, as understood by persons skilled in the art. For instance, for transmission to a target running the Windows™ family of operating systems, an "exe" file can be executed or a Windows Installer (MSI) process can be run, as understood by persons skilled in the art. For instance, for transmission to a target running the Unix™ operating system, a "pkg" command can be run, or a tarball can be unzipped, as understood by persons skilled in the art. A target can thereby receive and install a compatible management agent 120, and invoke, install, and/or update services and/or applications hosted by set of management servers 112, such as configuration management services, performance monitoring services, security services, and/or other network management or configuration services hosted by those servers. It may be noted that the ability to access and/or update those services via management agent 120 registered and generated to a target according to techniques described herein can be independent of the need to invoke any proprietary or associated package management platforms or tools related to targets, agents, or services.

Figure 3:
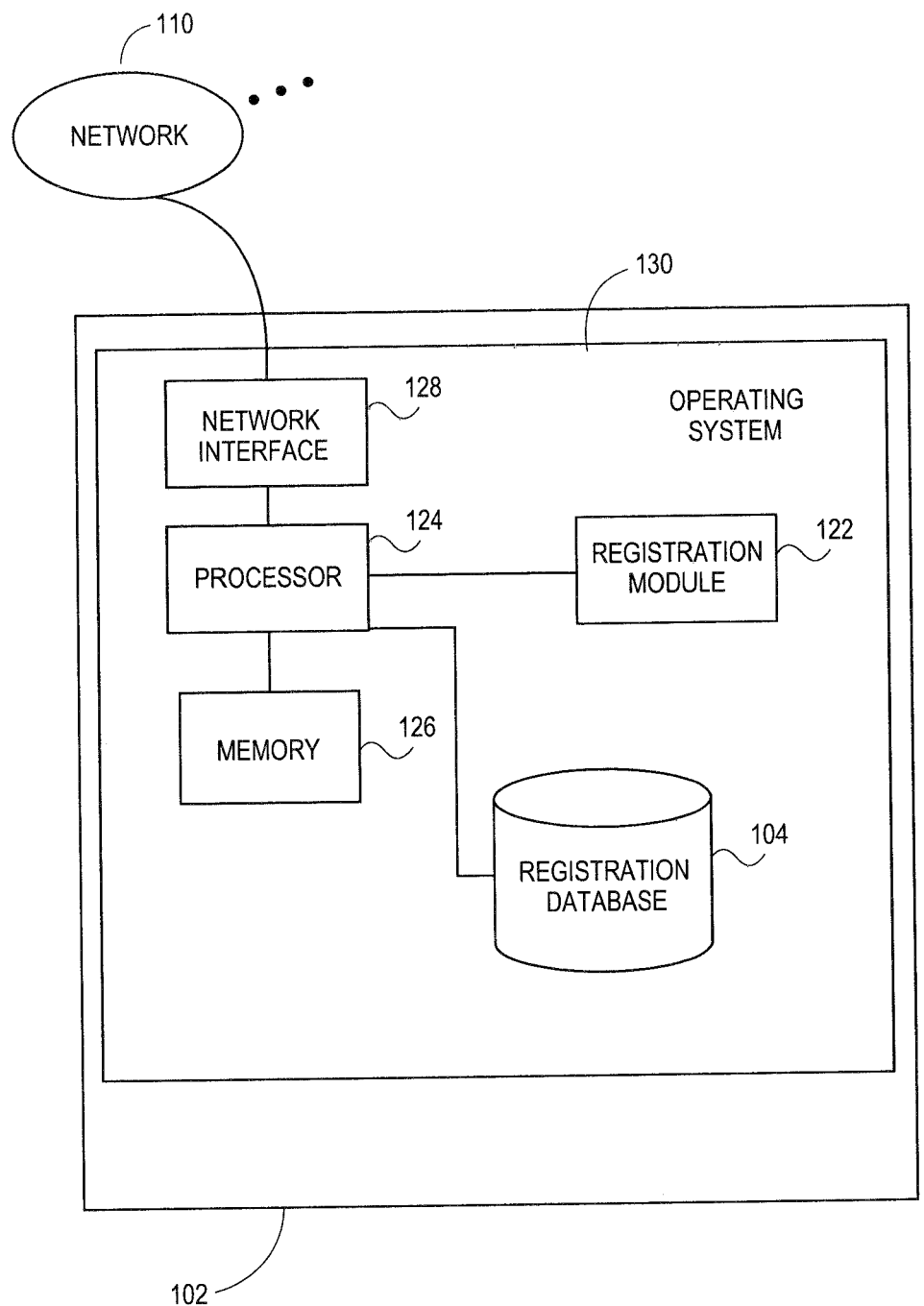
FIG. 3 illustrates an exemplary hardware configuration of a deployment server and associated resources, according to various embodiments.

FIG. 3 illustrates an exemplary diagram of hardware and other resources that can be incorporated in a registration server 102 configured to communicate with managed network 10 including set of target machines 116, set of management servers 112, and/or other resources, according to embodiments. In embodiments as shown, the registration server 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a registration store 104, such as a database stored on a local hard drive. Processor 124 further communicates with network interface 128, such as an Ethernet or wireless data connection, which in turn communicates with one or more managed network 110, which can be, include, or be accessed with via private or secure channels, and/or the Internet or other public or private networks. Processor 124 also communicates with registration tool 120 and/or other resources or logic, to execute control, messaging, agent installation, and other management processes described herein. Other configurations of the registration server 102, associated network connections, and other hardware and software resources are possible. While FIG. 3 illustrates registration server 102 as a standalone system comprises a combination of hardware and software, registration server 102 can also be implemented as a software application or program capable of being executed by a conventional computer platform. Likewise, registration server 102 can also be implemented as a software module or program module capable of being incorporated in other software applications and programs. In either case, registration server 102 can be implemented in any type of conventional proprietary or open-source computer language.

Figure 4:
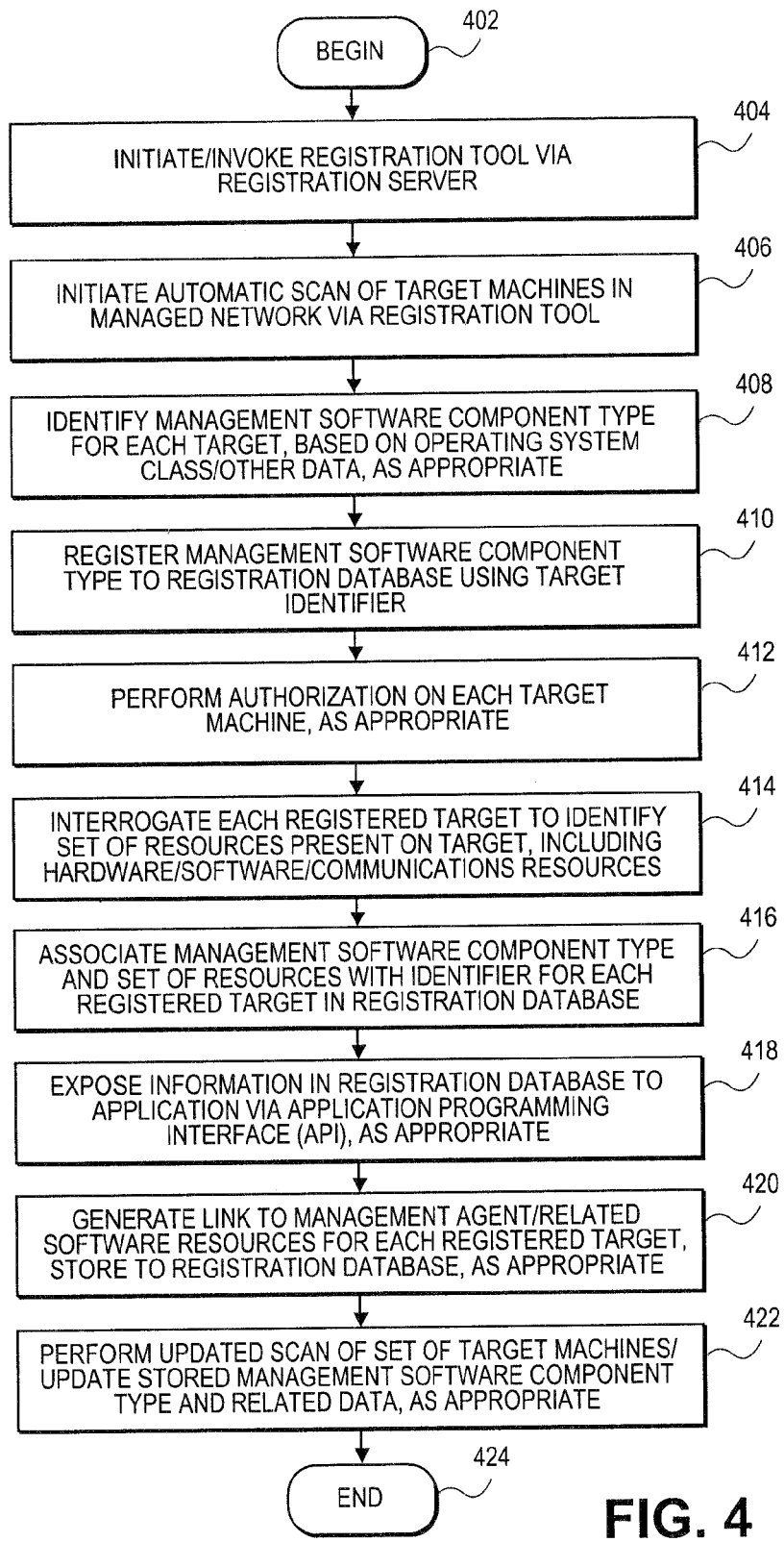
FIG. 4 illustrates a flowchart of installation processing that can be used in systems and methods for registering software management component types in a managed network, according to various embodiments.

FIG. 4 illustrates a flowchart of overall processing that can be used in systems and methods for registering software management component types in a managed network, according to various embodiments. In 402, processing can begin. In 404, registration tool 120 can be invoked or instantiated via registration server 102, for instance by user selection or other techniques. In 406, an automatic scan of set of target machines 112 can be initiated in managed network 110. In 408, registration tool 120 can identify one or more management software component type for each target, for example, based on the operating system class and/or other data related to a given machine. Thus for instance, a first target can be determined to have the Linux™ operating system installed, and the management software component type may require or be compatible with, for instance, installation via an unzipped tarball. In 410, the one or more management software component type (or null result if applicable) for a subject target can be registered to registration database 104, and can be stored in association with an identifier for the target machine, such as a serial number, media access control (MAC) address, Internet Protocol (IP) address, or other identifier.

In 412, an authorization procedure can be invoked for some or all machines in set of target machines 112, as appropriate, including, for instance, exchange of user ID/password, digital certificates, or other information. In 414, registration tool 120 can interrogate each registered target to identify a set of resources present in or installed on the subject target, including, for instance, hardware resources, software resources, communications resources, and/or other resources. In 416, registration tool 120 can associate information including the management software component type, the set of target resources, and the target identifier for each registered target in registration database 104. In 418, the information stored in registration database 104 can be exposed to one or more applications in set of target machines 112 or otherwise via an application programming interface (API), as appropriate. In 420, registration tool 120 can generate a link or association to one or more management agent 120 and/or related resources for each registered target. For instance, a link to a management agent 120 corresponding to an operating system class hosted in a target can be stored or associated in registration database 104. In aspects, registration tool 120 can initiate or provide selections to initiate the installation of management agent 120 in the subject target. In 422, registration tool 120 can perform an updated scan of set of target machines 112 and/or update the stored management software component type and related data, as appropriate. In 424, processing can repeat, return to a prior processing point, jump to a further processing point, or end.

The foregoing description is illustrative, and variations in configuration and implementation may occur to persons skilled in the art. For example, while embodiments have been described which operate in a network incorporating one registration server 102 communicating with managed network 110, in embodiments, more than registration server 102 or related hosts can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   accessing a target machine via a registration tool to identify a management software component type for the target machine;
   registering the management software component type for the target machine to a registration database;
   interrogating the target machine to identify an inventory of resources present in the target machine;
   associating, by a processor, the management software component type and the inventory of resources with an identifier for the target machine;
   storing the identifier, the management software component type, and the inventory of resources for the target machine to the registration database; and
   generating, in view of the registration database, a link to a management software component to permit the target machine to download the management software component that corresponds to the management software component type, wherein the link is stored in the registration database.

2. The method of claim 1, wherein the management software component type is associated with an operating system class.

3. The method of claim 2, wherein the management software component type identifies at least one of an associated configuration management tool class, an associated network management tool class, an associated provisioning tool class, or an associated monitoring tool class.

4. The method of claim 1, wherein the accessing the target machine comprises scanning a network via the registration tool in view of predetermined criteria.

5. The method of claim 4, wherein the predetermined criteria comprises at least one of a set of predetermined network events or a predetermined schedule.

6. The method of claim 1, wherein the inventory of resources comprises at least one of hardware resources, software resources, communications resources, or security resources.

7. The method of claim 1, wherein accessing the target machine comprises performing an authorization routine via the registration tool for the target machine.

8. The method of claim 1, further comprising exposing the management software component type and the inventory of resources in the registration database to an application via an application programming interface (API).

9. The method of claim 1, wherein the management software component type is included in an extensible library of management software component types.

10. A system, comprising:
    a first interface to a target machine;
    a second interface to a registration database that stores information related to the target machine; and
    a registration server, to communicate with the target machine via the first interface and the registration database via the second interface, and to:
    access the target machine via a registration tool to identify a management software component type for the target machine, register a management software component type for the target machine to the registration database, interrogate the target machine to identify an inventory of resources present in the target machine, associate the management software component type and the inventory of resources with an identifier for the target machine, store the identifier, the management software component type, and the inventory of resources for the target machine to the registration database, and generate, in view of the registration database, a link to a management software component to permit the target machine to download the management software component that corresponds to the management software component type, wherein the link is stored in the registration database.

11. The system of claim 10, wherein the management software component type is associated with an operating system class.

12. The system of claim 11, wherein the management software component type identifies at least one of an associated configuration management tool class, an associated network management tool class, an associated provisioning tool class, or an associated monitoring tool class.

13. The system of claim 10, wherein the registration server is further to scan a network via the registration tool in view of predetermined criteria in order to access the target machine.

14. The system of claim 13, wherein the predetermined criteria comprises at least one of a set of predetermined network events or a predetermined schedule.

15. The system of claim 10, wherein the inventory of resources comprises at least one of hardware resources, software resources, communications resources, or security resources.

16. The system of claim 10, wherein the registration server is further to perform an authorization routine via the registration tool for the target machine in order to access the target machine.

17. The system of claim 10, wherein the registration server is further to expose the management software component type and the inventory of resources in the registration database to an application via an application programming interface (API).

18. The system of claim 10, wherein the management software component type is included in an extensible library.

19. A non-transitory computer readable storage medium, the non-transitory computer readable storage medium storing a set of computer readable instructions executable by a processor to perform operations comprising:

accessing a target machine via a registration tool to identify a management software component type for the target machine;

registering the management software component type for the target machine to a registration database;

interrogating the target machine to identify an inventory of resources present in the target machine;

associating, with the processor, the management software component type and the inventory of resources with an identifier for the target machine;

storing the identifier, the management software component type, and the inventory of resources to the registration database; and generating, in view of the registration database, a link to a management software component to permit the target machine to download the management software component that corresponds to the management software component type, wherein the link is stored in the registration database.

20. The non-transitory computer readable storage medium of claim 19, wherein the management software component type is associated with an operating system class.

* * * * *